United States Patent
Calderon et al.

(10) Patent No.: US 6,911,058 B2
(45) Date of Patent: Jun. 28, 2005

(54) METHOD FOR PRODUCING CLEAN ENERGY FROM COAL

(75) Inventors: Albert Calderon, Bowling Green, OH (US); Terry James Laubis, Bowling Green, OH (US)

(73) Assignee: Calderon Syngas Company, Bowling Green, OH (US)

( * ) Notice: Subject to any disclaimer, the term of this patent is extended or adjusted under 35 U.S.C. 154(b) by 749 days.

(21) Appl. No.: 09/901,554

(22) Filed: Jul. 9, 2001

(65) Prior Publication Data

US 2003/0005634 A1 Jan. 9, 2003

(51) Int. Cl.$^7$ ................................................ C10J 3/16
(52) U.S. Cl. .................. 48/197 R; 48/202; 48/203; 48/206; 48/210; 60/39.02; 60/39.12; 60/39.182; 252/373; 110/65 R; 202/118
(58) Field of Search .................. 48/197; 110/65 R; 60/39.02; 202/118; 49/62; 423/652; 208/8

(56) References Cited

U.S. PATENT DOCUMENTS

| | | | |
|---|---|---|---|
| 2,971,830 A | * 2/1961 | Kawai et al. | 48/206 |
| 3,976,548 A | * 8/1976 | Kevorkian et al. | 202/118 |
| 4,017,272 A | * 4/1977 | Anwer et al. | 48/197 R |
| 4,113,602 A | * 9/1978 | Gorbaty et al. | 201/24 |
| 4,113,615 A | * 9/1978 | Gorbaty | 210/694 |
| 4,261,167 A | 4/1981 | Paull et al. | |
| 4,445,441 A | * 5/1984 | Tanca | 110/165 R |
| 4,852,996 A | 8/1989 | Knop et al. | |
| 5,063,732 A | 11/1991 | Calderon | |
| 5,136,808 A | * 8/1992 | Calderon | 48/62 R |
| 5,469,699 A | 11/1995 | Daman | |
| 5,494,653 A | * 2/1996 | Paisley | 423/652 |
| 6,409,790 B1 | * 6/2002 | Calderon et al. | 75/10.12 |

* cited by examiner

Primary Examiner—Alexa Doroshenk
Assistant Examiner—Vinit H. Patel
(74) Attorney, Agent, or Firm—Marshall & Melhorn, LLC

(57) ABSTRACT

A method for producing clean energy from coal by feeding the coal in a reactor which is sealed to the atmosphere and moving the coal in the reactor while injecting oxygen to combust a portion of the coal in a substoichiometric mode to devolatilize the coal and yield a pressurized hydrogen rich raw gas which contains coal-derived cancer causing distillates and hydrocarbons together with a hot char. The distillates and the hydrocarbons are cracked to result in a cracked gas of essentially $2H_2$ and $1CO$ which after desulfurization becomes an ideal synthesis gas that can be synthesized to a liquid fuel for heating and transportation as an alternate to petroleum.

The hot char is gasified in an air blown gasifier to produce a fuel gas and a molten slag which are jointly directed out of the gasifier through a common port which is maintained open for the free flow of both. The fuel gas and the molten slag separate from each other by flowing both gas and slag through a molten bath in a submerged manner in order to effectively scrub the fuel gas in the molten bath while it bubbles out of the bath.

After separation the fuel gas is treated for sulfur removal and is in condition for use as an efficient gas turbine fuel for power generation by virtue of its mass, while producing very low $NO_x$ emissions when combusted. This fuel gas can also be used for raising steam and for clean burning in industrial heating. The method is capable of making coke and/or activated carbon.

40 Claims, 3 Drawing Sheets

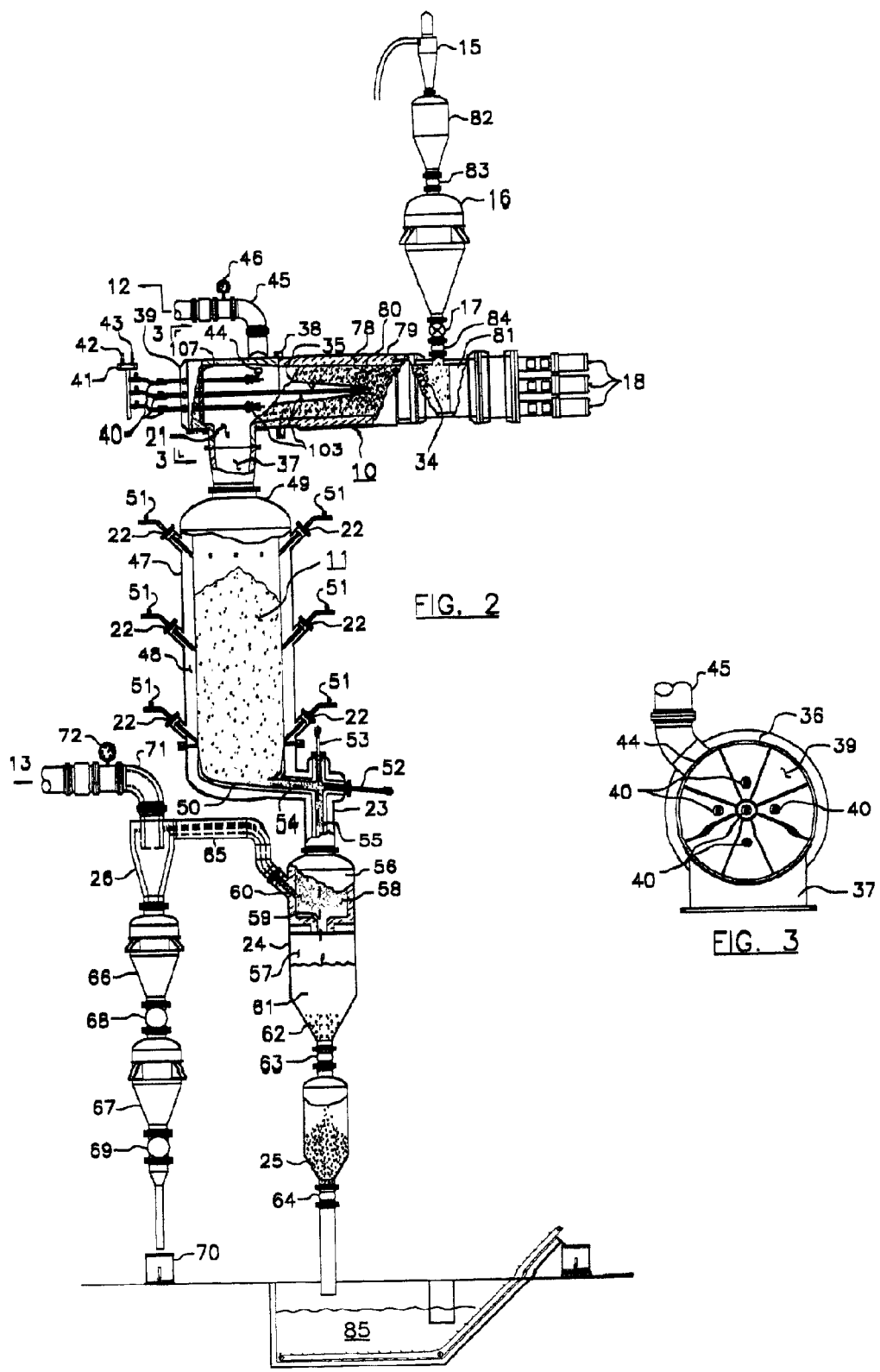

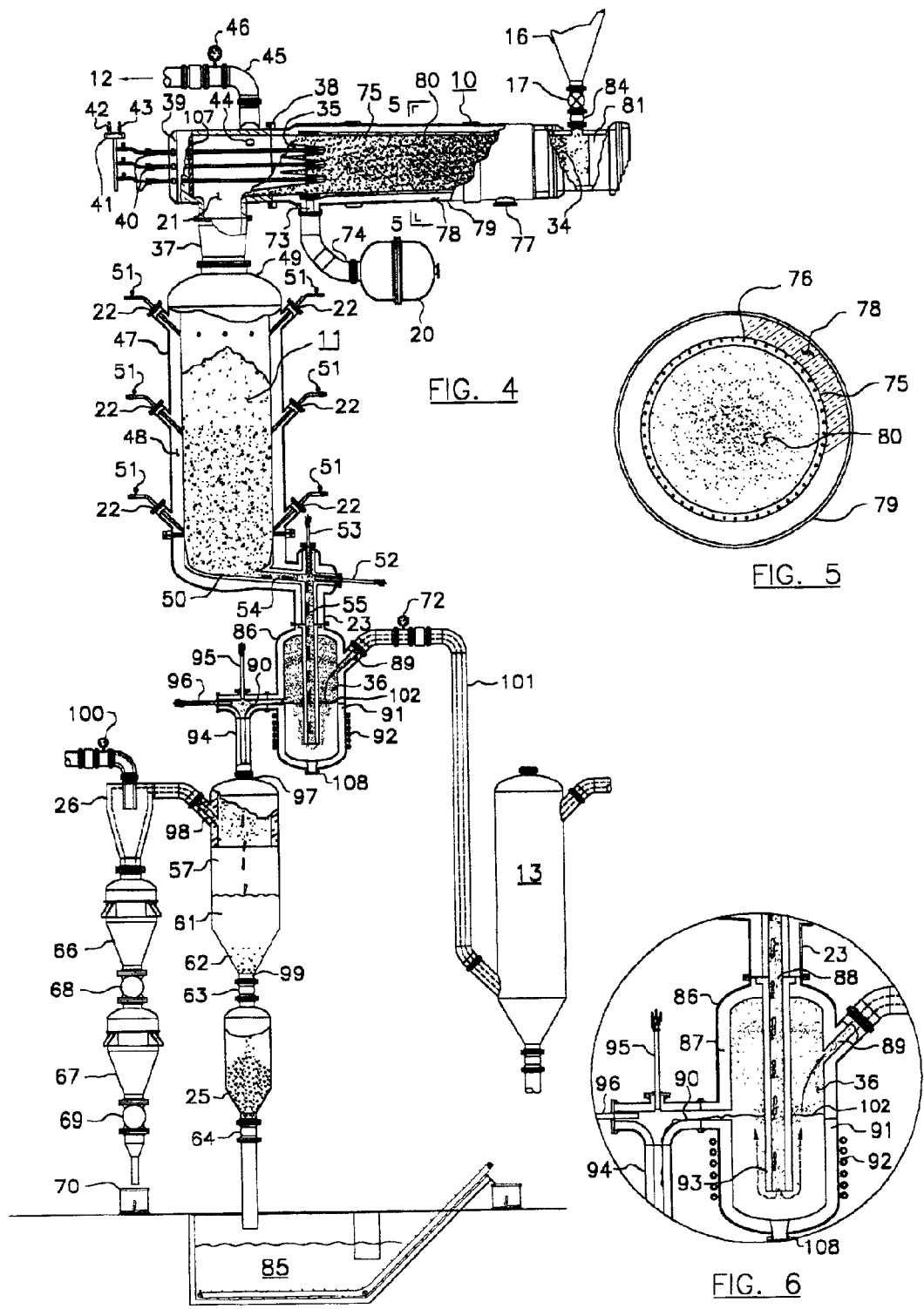

METHOD FOR PRODUCING CLEAN ENERGY FROM COAL

BACKGROUND OF THE INVENTION

This application is a further development of the applicant's issued U.S. Pat. No. 5,063,732 which discloses a method for repowering existing electric power plants while co-producing a clean liquid fuel; it also discloses that coal is first pyrolyzed to produce a rich gas which is cleaned and then synthesized to a liquid, and a char which is gasified to make a low Btu gas that is also cleaned and then used to generate electricity; this development resides in improving the referenced method as follows:

Reduction of the great number of process tubes (reactors) which reduces capital investment to make it economically viable.

Elimination of the complex charging system which comprises a revolving means to make it easy to maintain.

Improving the heating of the charge to increase efficiency.

Insuring that the gases produced in the process reactor flow in the proper direction to cause the cracking of undesirable cancer causing constituents of the coal.

Blowing the char gasifer in a down draft direction to overcome the excessive entrainment of particulate matter in the low Btu gas.

Preventing the plugging of the slagging port of the gasifier to obtain the free flow of slag out of the gasifier.

Mitigating the cooling effect of the slag quench to prevent the premature solidification of the molten slag before it is quenched.

INTRODUCTION

Of the three major fossil energy resources found in Nature, which consist of oil, natural gas and coal, 90% is coal; yet, we are unable to use coal in an environmentally acceptable manner. This invention which is environmentally closed, operated at pressure, and devoid of coal derived cancer causing agents, makes possible the use of coal in a clean, efficient and economical manner. Since coal is essentially an energy ore, it has impurities the same as any other ore. These impurities comprise ash, sulfur, and cancer causing distillates and hydrocarbons which are chemically bound in the volatile matter of the coal.

OBJECTIVES OF THE INVENTION

The main object of the present invention resides in the processing of coal which is considered to be a dirty fuel, to produce clean energy from it and enable mankind to utilize this abundant and affordable natural resource.

Another object of the present invention is to process the coal under pressure to increase efficiency and minimize capital investment by providing a module that is large enough in size and yet easy to heat under reducing conditions.

Still another object of the invention is to produce thermal energy in the form of clean gases from coal.

Yet another object of this invention is to apply it to existing coal burning electric power plants to render them clean and efficient, and give them a new lease on life thus saving capital investment of major proportions.

Therefore another object of the present invention resides in the recovery of hydrogen rich gas from the coal that can be converted to value added liquid fuels via synthesis as alternate to petroleum for transportation and heating.

Further another object of the present invention is to produce from coal a clean low Btu gas (lean gas) that produces low $NO_x$, when combusted, which is capable of generating power more efficiently while flowing through a gas turbine by virtue of its large mass.

Also another object of the present invention is to co-produce in a closed system a rich gas from the volatile matter of the coal which is high in hydrogen content for synthesis into liquids and chemicals, and a lean gas from the residual char for use as a fuel for generating electric power or for heating purposes.

Further yet another object of the present invention is to produce carbon from coal which can be used as a coke or activated carbon.

These and other objects of the present invention will become more apparent to those skilled in the art to which this invention pertains, and from the following description and appended claims. Reference is now made to the accompanying drawings forming a part of this specification. It is to be noted that the embodiments shown herein are for the purpose of description and not limitation.

BRIEF DESCRIPTION OF DRAWINGS

FIG. 2 shows equipment to carry out the method.

FIG. 3 is a section taken at 3—3 of FIG. 2.

FIG. 4 is an illustration showing another variation of the equipment shown in FIG. 2, which relates to heating of the coal and the discharging of the lean gas and molten slag.

FIG. 5 is a section taken at 5—5 of FIG. 4.

FIG. 6 is an enlargement of a portion of FIG. 4 showing an alternate approach for the separation of the gas from the molten slag than that shown in FIG. 2.

Figure 1:
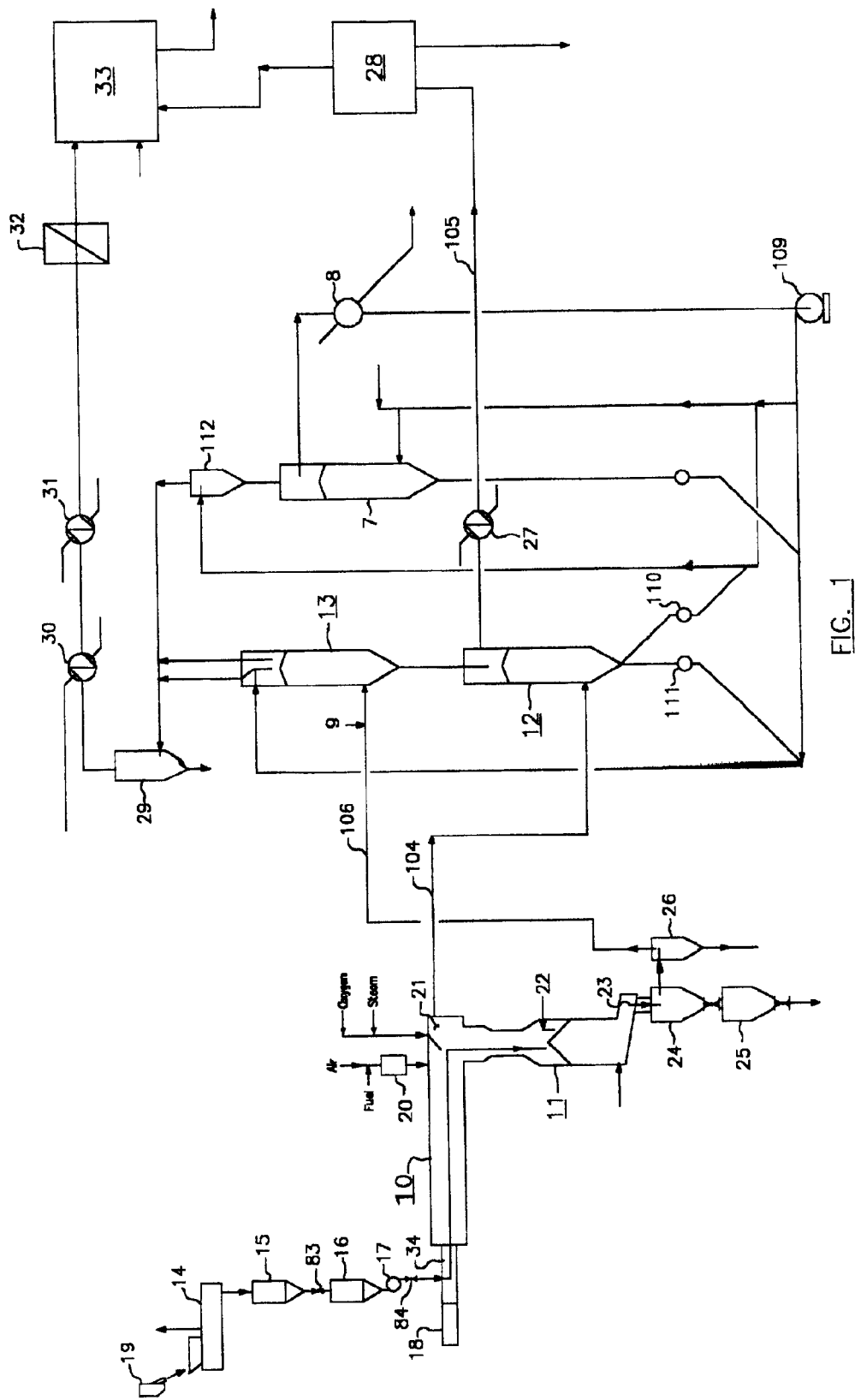
FIG. 1 illustrates the method by means of a process flow diagram, which by way of example is applied for co-production.

Before proceeding with the detailed description of the invention by making use of the drawings, it is to be noted that for the sake of clarity, reference will be made with numerals to represent various components.

DETAILED DESCRIPTION OF THE DRAWINGS

Reference is made to FIG. 1, which is a process flow diagram that illustrates the processing of coal to coproduce:- (i) a rich gas which is cleaned and synthesized to a liquid fuel such as methanol, diesel fuel, gasoline or a chemical, and (ii) a lean gas which is cleaned and used as fuel to generate electric power or provide thermal energy for heating. Numeral 10 represents a reactor chamber in which the coal is heated to produce a raw rich gas and a hot char. Numeral 11 represents the gasifier which converts the hot char to a raw lean gas, Numeral 12 represents the cleanup for the raw rich gas and numeral 13 the cleanup for the raw lean gas. Numeral 14 represents the coal dryer which receives coal from bunker 19; it is followed by surge hopper 15 and lockhopper 16. Beneath lockhopper 16, feeder 17 is disposed for flow control of the coal. A coal charger denoted by numeral 18 force feeds the coal into reactor 10. Burner 20 is used for start-up and may be used as an auxiliary source of heat. Oxygen and steam are injected from a gas cracking compartment at the discharging end of reactor 10, which is denoted by numeral 21. Cracking compartment 21 possesses a radiant zone in order to radiate thermal energy against the coal and char emerging from the discharging end of reactor 10.

Gasifier 11 is equipped with inlet port 22 and exit port 23. Inlet port 22 serves for the injection of an oxidant which preferably is preheated air, and exit port 23 serves for the discharge of the raw lean gas and molten slag. Beneath port 23, separator 24 is disposed which serves the dual purpose for the disengagement of the raw lean gas from the molten slag produced in gasifer 11, and for the quenching of the slag. Lockhopper 25 is used to remove the quenched slag without loss of system pressure. A first cyclone denoted by numeral 26 is provided to remove dust from the raw lean gas.

Downstream of rich gas cleanup 12, cooler 27 is provided prior to feeding the cleaned rich gas to the synthesis plant for making a chemical or a liquid fuel such as methanol, gasoline or diesel and the like as an alternate to petroleum, which is represented by numeral 28. Downstream of lean gas cleanup 13 a second cyclone denoted by numeral 29, is provided as a polishing bed; and downstream of cyclone 29, air pre-heater 30 and cooler 31 are situated. Beyond cooler 31, an activated carbon bed/pressurized baghouse denoted by numeral 32, is disposed. The raw lean gas after having been cleaned is directed as a cleaned lean gas, to a station such as an electric power house, a heating plant, an industrial furnace facility, etc., which is represented by numeral 33.

Referring to FIG. 2, numeral 10 is the reactor for processing the coal and numeral 11 is the gasifier for converting the char into gas and the ash into slag. Reactor 10 possesses a charging end denoted by numeral 34 and a discharging end denoted by numeral 35. Extending beyond discharging end 35 a gas cracking compartment denoted by numeral 21, is provided; it is equipped with a downcomer denoted by numeral 37 which serves to interconnect reactor 10 to gasifier 11. One end of cracking compartment 21 is open and connects to discharging end 35 of reactor 10 by means of flange connection 38, and the other end of compartment 21 is closed and serves as the radiation wall, denoted by numeral 39, through which the penetration of lance 40 takes place. Lance 40 which can be advanced or retracted serves for the injection of oxidant such as air or oxygen, and possibly steam; when producing rich gas relatively pure oxygen is injected. Lance 40 may also be equipped to inject an oxygen fuel combination to increase the energy input into compartment 21. To raise the $H_2$ content of the gas some steam may be added to the oxygen, this being done when making syngas for the production of liquid fuels. A plurality of lances such as lance 40, may be used for a large diameter reactor and in so doing, a manifold denoted by numeral 41 is provided with inlet port 42 for the oxygen and inlet port 43 for the steam. By way of example penetration points into wall 39 by lances 40 are shown in FIG. 3. An exit port denoted by numeral 44 is provided to cracking compartment 21 for the exhaust of the cracked rich gas, which communicates with gas pipe 45; a pressure valve denoted by numeral 46, is disposed to pipe 45 to control the back pressure in cracking compartment 21. The continuation of pipe 45 (not shown, but indicated by the directional arrow) ties to rich gas cleanup 12 shown in FIG. 1.

Gasifier 11 which is connected via downcomer 37 to compartment 21, is a shaft type vessel made up of pressure shell 47, lining 48, top 49 and bottom 50. Penetrations through shell 47 and lining 48 are provided to accommodate inlet ports 22 for the introduction of an oxidant, preferably in the form of pre-heated air for the conversion of the hot char to a raw lean gas and the ash in the char to a molten vitreous slag. Relatively pure oxygen and steam may replace the air if the carbon content of the hot char is to be converted to a syngas. Flow control means, denoted by numeral 51 are provided for the control of the air into gasifier 11. Air may be introduced at different levels of gasifier 11. Bottom 50 of gasifier 11 is configured in such a way to preferably slope towards exit port 23 which is equipped with piercing lances 52 and 53 that are adapted to use a gas such as oxygen to keep horizontal passage 54 and vertical passage 55 of exit port 23, open to insure the free flow of gas and molten slag out of gasifier 11.

Separator 24 located below exit port 23, is a pressure vessel divided into two parts:- An upper part denoted by numeral 56 and a lower part denoted by numeral 57. Upper part 56 comprises disengagement zone 58 which is equipped with a discharge slag nozzle 59 and gas exit port 60. Lower part 57 comprises slag quenching pool 61 which is supplied with water, and surge hopper 62. Isolation valve 63 connects surge hopper 62 to lockhopper 25 which is equipped at the bottom with valve 64 in order to remove the quenched slag from the process without losing system pressure by maintaining valve 63 closed and valve 64 open during the discharge of the quenched slag into sump 85.

Gas exit port 60 communicates with cyclone 26 via header 65 which directs the separated gas to cyclone 26. Cyclone 26 is equipped at the bottom with surge hopper 66 which in turn is connected to lockhopper 67; isolation valves 68 and 69 permit lockhopper 67 to discharge particulate matter into collection box 70 which is open to the atmosphere, without loss of system pressure. Cyclone 26 is equipped with exit gas main 71 to direct the lean gas for further treatment. Pressure control valve 72 serves to control the back pressure in gasifier 11. The continuation of gas main 71 (not shown but indicated by the directional arrow) ties to lean gas cleanup 13 shown in FIG. 1.

Referring to FIG. 4 and supported by FIG. 5 for additional detail, reactor 10 is similar to reactor 10 shown in FIG. 2 with certain modifications. Reactor 10 in FIG. 4 possesses burner 20 leading to inlet port 73 via duct 74 for the flow of hot flue gases to a heating element denoted by numeral 75, which partially heats the coal indirectly and circumferencially by conduction, with the flue gases flowing through flues 76 (shown in FIG. 5) and exiting from outlet port 77. An insulating material denoted by numeral 78 is disposed between heating element 75 and pressure shell 79, the coal mass within reactor 10 being shown by numeral 80. Both reactors shown in FIGS. 2 and 4, are provided with a taper to diverge from charging end 34 to discharging end 35 to facilitate the movement of the coal within reactor 10 as it is force fed by means of ram 81 actuated by coal charger 18 (shown in FIG. 1).

Referring again to FIG. 4, beneath gasifier 11, a receiver denoted by numeral 36 is provided; receiver 36 which is shown enlarged in FIG. 6, comprises shell 86, lining 87 and ports 88, 89 and 90. The lower part of receiver 36 is finished with a crucible which is denoted by numeral 91; crucible 91 is adapted to be heated such as with induction coil 92. A snorkel denoted by numeral 93 extends downwardly from port 88 into receiver 36 for directing the gas and the molten slag into receiver 36 in a submerged manner and in such a way as to have the gas bubble through the molten slag and flow out of receiver 36 via port 89. Port 90 is provided for the molten slag to flow out of receiver 36 when the level of the molten slag reaches the spilling level denoted by numeral 102, as shown more clearly in FIG. 6. Receiver 36 is provided with a bottom discharge 108 when conditions arise that necessitate the emptying of the contents of receiver 36. Downstream of gas exit port 89, gas main 101 is furnished to connect receiver 36 with gas cleanup 13.

Downstream of port 90 slag quenching vessel 57 is provided with downcomer 94 connecting receiver 36 to quenching vessel 57. Lancing means 95 and 96 are also provided in order to maintain downcomer 94 open by injection of an oxidant; this insures the free flow of the molten slag. Quenching vessel 57 possesses three ports 97, 98 and 99; port 97 is for the entry of the molten slag from downcomer 94; port 98 is for the exit of the steam generated when the molten slag drops into the water bath denoted by numeral 61, and port 99 is for the discharge of the quenched slag. Particulate matter from the steam is removed by any known method as for example cyclone 26, which was described earlier by making reference to FIG. 2. A control valve denoted by numeral 100 is provided for pressure balancing at the exit of cyclone 26. Control valve 100 insures that steam generated from the quench does not back into receiver 36 by keeping the pressure in receiver 36 higher than the pressure in quenching vessel 57 to prevent premature solidification of the slag caused by the cooling effect of the steam.

OPERATION

In describing the operation of the instant invention, as stated above, coal is essential an energy ore with the following constituents:- carbon, ash, sulfur and volatile matter (gas). In order to be able to use coal in a clean manner, the impurities which consist of the ash, sulfur, and the cancer causing portions in the gas must be removed and converted to useful products. The ash must be vitrified to become non-leaching, the sulfur must be removed as elemental sulfur, and the cancer causing distillates such as tars and light oils which include benzene, must be destroyed by cracking. Various configurations will be described in order to respond to the need to which the invention is applied. The configuration which relates to the co-production of syngas for synthesis into liquid fuel(s) for transportation or heating, and of fuel gas for the generation of electric power will be described in detail and the others will be described by reference to the co-production while pointing out the differences.

Reference is now made to FIG. 1, which configuration relates to co-production. Coal is fed from bunker 19 into drier 14 thence to lockhopper 16 via surge hopper 15. The coal may have other material(s) with it such as biomass and/or waste to be processed with the coal. Once lockhopper 16 is full, it is locked and feeder 17 controls coal from lockhopper 16 into charging end 34. Coal charger 18 force feeds the coal into reactor 10 in such a way as to compact the coal and make it dense and essentially impervious to gas flow at the charging end to force pressurized raw gases generated during the combination of a portion of the coal, to flow co-current with the movement of the coal in reactor 10 and towards discharging end of reactor 10, Assuming that start-up burner 20 has ignited the coal at the discharging end of reactor 10 and the process is already at steady state the coal is advanced in reactor 10 while oxygen (and possibly steam) are injected via lance(s) 40 into the coal preferably from cracking compartment 21 to devolatilize the coal and produce a raw rich gas while the environment is kept under reducing conditions by operating sub-stoichiometrically. The temperature of compartment 21 is maintained above the cracking temperature of coal tar, oils, hydrocarbons, etc. to crack these cancer causing compounds to result in a hydrogen rich cracked gas which is directed via conduit 104 to gas cleanup 12 for further treatment such as desulfurization to thus yield an ideal synthesis gas of $2H_2$ and $1CO$. In the event that not enough fuel exists in compartment 21 by virtue of using low volatile coal supplemental fuel maybe added with the oxygen in order to attain cracking temperatures. Cracking compartment 21 which serves to separate the rich gas from the hot char is also used to pretreat the raw rich gas by cracking the cancer causing liquids and hydrocarbons from the coal by means of elevated temperature in cracking compartment 21 through the injection of sufficient oxidant via ports 103 (shown in FIG. 2) of lance 40 and combusting some of the volatile matter from the coal to yield a cracked gas which is devoid of coal liquids and hydrocarbons and whose composition is mainly $H_2$ and $CO$ with $H_2$ being the dominant gas, Within compartment 21, radiant zone 107 provides efficient thermal energy transfer to the coal emerging from discharging end 35. The coal/char is pushed out of chamber 80 progressively in a pulsating mode in order to provide a fresh new face of coal/char which is heated frontally by radiation from compartment 21. Depending upon the coal used it is possible to obtain a cracked gas of $2H_2$ and $1CO$ from the process without the need for a shift converter which is known in the art. If inadequate volatile matter is contained in the coal, steam is added in order to increase the $H_2$ content of the gas. Subsequent to cleanup the synthesis gas thus produced, is comprised of the essential proportions of $2H_2$ to $1CO$. This gas when cooled in heat exchanger 27 and directed to plant 28 via duct 105 is ideal for synthesizing it into a liquid. Plant 28 may be a Fischer Tropsch or a methanol plant which in turn may be followed by a methanol-to-gasoline train, such as the one developed by Mobil Oil. These processes for conversion of the synthesis gas to various liquids are known in the art and are not part of this invention. Since the major cost of making an alternate to petroleum liquid fuel from synthesis gas is the cost of producing the synthesis gas, the cracking of the volatile matter of the coal as described herein, is an elegant and economical approach for making the feedstock for the sythesis plant(s).

The hot char which is quite porous and highly reactive resulting from the devolatilization of the coal, drops into gasifier 11 and is gasified with air which may be preheated. The air is preferably injected into gasifier 11 in the downdraft mode which tends to equilibrate the temperature of the char; the air may be injected at several points as shown in FIGS. 2 and 4. The air reacts with the carbon in the char to make a producer gas which is also known as "lean gas" by virtue of its low Btu content. This lean gas is fed to hot gas cleanup 13 via duct 106 for sulfur removal; in the event the lean gas is not up to temperature for the hot gas cleanup, an oxidant is added as denoted by numeral 9 prior to entry into cleanup vessel 13. After exiting from cleanup 13, the lean gas is directed to cyclone 29 for particulate removal and thence to air preheater 30. The lean gas after exiting from preheater 30, is directed to heat exchanger 31 to raise steam which is used in the process for $H_2$ generation, for moderating temperatures, for steam tracing, etc. The lean gas is then introduced to filter/baghouse 32 for mercury and alkali control and thence the gas is directed to station 33 which may represent an electric power plant. This lean gas is an excellent fuel for use in a combustion turbine by virtue of its mass to generate electric power more efficiently and by virtue of its low formation of $NO_x$ when combusted, since it burns cool. The combustion turbine may be followed by a steam turbine to provide a combined cycle arrangement, an efficient manner of producing electricity, which is in common practice.

In addition to the lean gas made in the gasifier, the ash in the coal is converted to a molten slag, and both the lean gas and molten slag are discharged from gasifier 11 via exit port 23 into separator 24 wherein the gas is directed to cyclone 26 and the slag after having been quenched is fed into lockhopper 25 for discharge into the atmosphere without loss of system pressure. The slag so produced is vitreous and inert which passes the non-leachability test.

The sulfur in both the raw rich gas and the raw fuel gas leaves the process in the form of $H_2S$ which is removed by any one of known systems including the applicant's own system described in the referenced patent. The $H_2S$ is absorbed by a sorbent contained in cleanup 12 and 13 shown in FIG. 1. The sorbent which is recycled and regenerated in vessel 7, extracts the sulfur in elemental form as a vapor and is condensed in a condenser which is denoted by numeral 8. The off-gas from condenser 8 which is used for recycling the sorbent, is boosted in pressure in compressor 109. A side stream from cleanup vessel 12, is diverted by means of valve feeder 110 for regeneration in regenerator 7. Valve feeder 111 recycles the sorbent to cleanup vessel 13. A cyclone above regenerator 7, denoted by numeral 112 removes particulate matter from the recycling off-gas.

In utilizing this invention for the exclusive manufacture of synthesis gas, the air in gasifier 11 is substituted by oxygen and steam to react with the char and thus produce additional $H_2$ rich gas which after cleanup can be synthesized to a liquid and/or chemical the same as the $H_2$ rich gas derived from the cracked gas after it undergoes a shift reaction which is known in the art of gasification.

In utilizing this invention for the exclusive manufacture of fuel gas, the oxygen injected through the cracking reactor is diluted with air to produce a lean gas which after cleanup can be used as a fuel gas the same as that produced from gasifier 11 when blown with air. The fuel gas can be used as a fuel for various heating applications including electric power generation.

It is also the purpose of this invention to repower existing power plants in order to give them a new lease on life as more than 50% of the electric power is still produced in polluting pulverized coal boilers in the United States.

Another application of the invention is to process the coal in reactor 10 to make coke or char and not gasifying it, such coke being useable in the field of metallurgy. The char while incandescent is treated with steam to make it into activated carbon for utilization in filtering systems including the removal of mercury.

It is submitted that the presentation made herein discloses a method which can process coal for producing abundant clean energy efficiently and in an environmentally closed manner for heating, transportation, electric power, chemicals and the like, as an alternate to petroleum and natural gas, including the capability to make coke and activated carbon.

What is claimed is:

1. A method for producing clean energy from coal comprising:
    feeding coal into a chamber which is sealed to the atmosphere and which possesses a charging end and a discharging end;
    moving the coal within said chamber towards the discharging end;
    injecting oxygen which is essentially pure in such a way as to combust a portion of the coal while maintaining a pressurized reducing atmosphere to:
        (i) cause the release of thermal energy to devolatilize the coal; and
        (ii) yield a pressurized hydrogen rich raw gas containing coal-derived cancer causing distillates and hydrocarbons together with a hot char;
    cracking the coal-derived cancer causing distillates and hydrocarbons contained in the hydrogen rich raw gas to make a hydrogen rich cracked gas which after desulfurization becomes a clean hydrogen rich synthesis gas;
    directing the hot char to a gasifier which is sealed to the atmosphere;
    gasifying the hot char with an oxidant in said gasifier to yield a raw second gas and a molten slag;
    flowing the raw second gas together with the molten slag through a common port out of said gasifier to maintain said port open for the free flow of the raw second gas and the molten slag;
    separating the raw second gas from the molten slag after exiting from said common port;
    directing the raw second gas to a cleanup system to clean it and thus yield a clean second gas; and
    quenching the molten slag to convert it to a non-leaching solid.

2. The method set forth in claim 1 further comprising the synthesizing of said clean hydrogen rich synthesis gas into a liquid fuel or chemical.

3. The method set forth in claim 1 further comprising the utilizing of said clean second gas for the generation of electric power.

4. The method set forth in claim 1 including the using of preheated air gasify the hot char.

5. The method set forth in claim 1 including the using of oxygen enriched air to gasify the hot char.

6. The method set forth in claim 1 wherein the step of gasifying the hot char with an oxidant in said gasifier comprises the injection of the oxidant in a downdraft mode.

7. The method set forth in claim 6 further comprising the injection of the oxidant at a plurality of penetrations into said gasifier.

8. The method set forth in claim 1 further comprising the step of compacting the coal against the wall of the chamber at the charging end to such an extent as to density the coal to essentially make it impervious to gas flow at the charging end in order to force pressurized raw gases generated during the heating of the coal to flow out of the discharging end of said chamber.

9. The method set forth in claim 1 wherein the step of flowing the raw second gas together with the molten slag through a common port of said gasifier includes the step of providing supplementary thermal energy to prevent solidification of the molten slag in said port.

10. The method set forth in claim 9 includes the step of providing oxidant injection means to combust a portion of said raw second gas to create said supplementary thermal energy.

11. The method set forth in claim 9 wherein said supplementary thermal energy is derived from electric induction means.

12. The method set forth in claim 1 wherein the step of flowing the raw second gas together with the molten slag through a common port out of said gasifier includes the collecting of the molten slag in a receiver to serve as a molten bath.

13. The method set forth in claim 12 further comprising the step of directing the raw second gas together with the molten slag to the receiver in a submerged fashion to cause the raw second gas to bubble through said molten bath in order to separate the entrained slag from the raw second gas and to essentially scrub the second gas by making use of the molten slag in said receiver.

14. The method set forth in claim 13 further comprising the step of providing a gas exit port above the bath for the discharge of the scrubbed second gas.

15. The method set forth in claim 12 further comprising the step of providing a spillway for the molten slag to flow out of said receiver.

16. The method set forth in claim 17 further comprising the step of providing downstream of said spillway a water quenching chamber to cool the molten slag to a non-leaching solid.

17. The method set forth in claim 12 further comprising the step of heating the receiver.

18. The method set forth in claim 17 wherein the heating of the receiver is derived from electric induction means.

19. The method set forth in claim 1 wherein the method is conducted under pressure.

20. The method set forth in claim 1 wherein the step of injecting oxygen which is essentially pure in such a way as to combust a portion of the coal is further characterized by the step of injecting the oxygen from a compartment located downstream of the discharging end of said chamber.

21. The method set forth in claim 20 further comprising a hot radiant zone disposed to said compartment to reflect intense thermal energy against the coal in the discharging end of said chamber to expedite devolatilization of the coal and crack coal distillates and hydrocarbons which are cancer causing.

22. The method set forth in claim 1 including circumferential heating of a coal mass from the direction of the wall of said chamber.

23. The method set forth in claim 1 wherein the step of moving the coal within the chamber towards the discharging end is further characterized by moving the coat progressively with pauses in order to create successive new frontal faces of coal at the discharging end of said chamber for the efficient exposure of the coal to radiant heat.

24. The method set forth in claim 1 being further characterized by balancing the pressure between the step of injecting oxygen to combust a portion of the coal and the step of gasifying the char with an oxidant so as to essentially prevent the contamination of the hydrogen rich gas by the second gas.

25. The method set forth in claim 1 further comprising the injection of oxygen which is essentially pure in such a way as to combust a portion of the coal at a plurality of points to more efficiently combust coal while maintaining a reducing atmosphere.

26. The method set forth in claim 1 wherein an oxidant is added to raise the temperature of the hydrogen rich cracked gas prior to its desulfurization.

27. The method set forth in claim 26 wherein the desulfurization occurs in a cleanup system which is regenerative.

28. The method set forth in claim 1 wherein an oxidant is added to raise the temperature of the second gas prior to its desulfurization.

29. The method set forth in claim 28 wherein the desulfurization occurs in a cleanup system which is regenerative.

30. The method set forth in claim 1 further comprising the tapering of the reactor chamber in such a way as to diverge towards the discharging end to facilitate the movement of the coal within the chamber.

31. The method set forth in claim 1 further comprising the passing of gases in flues provided to the chamber of said reactor.

32. The method set forth in claim 1 further comprising the addition of biomass to the coal for processing them in unison.

33. The method set forth in claim 1 further comprising the addition of waste to the coal for processing them in unison.

34. The method set forth in claim 1 being further characterized by balancing the pressures between the step of injecting oxygen and the step of gasifying the char, and the step of gasifying the char and the quenching of the molten slag in order to control the various flows of the gases in the process.

35. The method set forth in claim 1 wherein the hot char is gasified with essentially pure oxygen and steam in order to make a hydrogen rich raw gas from the char which, after cleanup, a clean synthesis gas is obtained which can be synthesized into a hydrogen rich gaseous or liquid fuel.

36. The method set forth in claim 1 wherein the hot char is gasified with air to yield a raw fuel gas which after cleanup yields a clean fuel gas suitable for combustion with low $NO_x$ formation.

37. A method for producing clean energy from coal comprising:

feeding coal into a chamber which is sealed to the atmosphere and which possesses a charging end and a discharging end;

moving the coal within said chamber towards the discharging end;

injecting gas comprising oxygen in such a way as to combust a portion of the coal while maintaining a pressurized reducing atmosphere to:
(i) cause the release of thermal energy to devolatilize the coal; and
(ii) yield a pressurized raw gas containing coal-derived cancer causing distillates and hydrocarbons together with a hot char;

directing the pressurized raw gas in such a way as to emerge from the discharging end of said chamber;

cracking the coal-derived cancer causing distillates and hydrocarbons contained in the raw gas to make a first cracked gas;

directing the hot char to a slagging gasifier which is sealed to the atmosphere and gasifying same to make a second gas and a molten slag;

removing said slag from the system; and cleaning said first gas and said second gas to provide clean gases for useful applications.

38. The method set forth in claim 37 further comprising the injection of steam with said oxygen.

39. A method for producing clean energy from coal comprising:

feeding coal into a chamber which is sealed to the atmosphere and which possesses a charging end and a discharging end;

moving the coal within said chamber towards the discharging end;

injecting gas comprising oxygen which in such a way as to combust a portion of the coal while maintaining a pressurized reducing atmosphere to:
(i) cause the release of thermal energy to devolatilize the coal; and
(ii) yield a pressurized raw gas containing coal-derived cancer causing distillates and hydrocarbons together with a hot coke;

cracking the coal-derived cancer causing distillates and hydrocarbons contained in the raw gas to make a cracked gas which after desulfurization becomes a clean gas;

separating the cracked gas from the coke to yield metallurgical coke.

40. The method set forth in claim 39 wherein the coke is converted to activated carbon.

* * * * *